United States Patent
Svetlik

[19]

[11] Patent Number: 5,829,793
[45] Date of Patent: Nov. 3, 1998

[54] SELF-RESTRAINED ADAPTER SYSTEM FOR CONNECTING PLASTIC PIPE SYSTEM TO METALLIC PIPE SYSTEM

[75] Inventor: Harvey E. Svetlik, Dallas, Tex.

[73] Assignee: Phillips Petroleum Company, Bartlesville, Okla.

[21] Appl. No.: 676,073

[22] Filed: Jul. 5, 1996

[51] Int. Cl.$^6$ .................................................. F16L 55/00
[52] U.S. Cl. .................... 285/148.13; 285/368; 285/374; 285/423
[58] Field of Search ..................................... 285/174, 423, 285/368, 148.13, 374

[56] References Cited

U.S. PATENT DOCUMENTS

| | | | |
|---|---|---|---|
| 3,004,780 | 10/1961 | Main | 285/423 X |
| 3,236,543 | 2/1966 | Mueller | 285/174 X |
| 3,262,721 | 7/1966 | Knight | 285/174 |
| 3,265,414 | 8/1966 | Reid et al. | 285/423 X |
| 3,533,649 | 10/1970 | Williams | 285/174 |
| 4,295,668 | 10/1981 | Louthan et al. | 285/21 |
| 4,610,471 | 9/1986 | Halen et al. | 285/174 X |
| 4,793,638 | 12/1988 | Baldwin, Jr. | 285/174 |
| 4,878,698 | 11/1989 | Gilchrist | 285/342 |
| 4,997,214 | 3/1991 | Reese | 285/174 |

*Primary Examiner*—Dave W. Arola
*Attorney, Agent, or Firm*—Ryan N. Cross

[57] ABSTRACT

An adapter for connecting a plastic pipe system to a metallic pipe system; including an elongated, plastic sleeve having a first end thereof adapted to be joined to a plastic pipe system and a second end thereof adapted to be joined to a metallic pipe system wherein said second end has a flange formed as an integral part of said plastic sleeve. A gland means is used to attach the plastic sleeve to the metallic pipe system wherein the gland means is adapted to exert longitudinal pressure on said flange. The invention provides pressure sealing and restraint against axial pull-out that would result in the loss of the pressure seal.

2 Claims, 7 Drawing Sheets

SELF-RESTRAINED ADAPTER SYSTEM FOR CONNECTING PLASTIC PIPE SYSTEM TO METALLIC PIPE SYSTEM

BACKGROUND OF THE INVENTION

The present invention relates to an adapter for connecting a plastic pipe system to a metallic pipe system so as to provide a pressure seal and restraint against axial pull-out. More specifically, the present invention relates to an adapter for connecting a plastic pipe system to a metallic pipe system in which the end of the adapter, connectable to the metallic pipe system, is reinforced. In another aspect the present invention relates to a pipeline structure comprising a plastic pipe system and a metallic pipe system coupled by an adapter.

In pipeline structures, it has become rather common practice to utilize metallic pipe systems for a portion of the piping service and plastic pipe systems for other portions. One problem encountered in such piping systems is the difficulty of connecting the plastic pipe system to the metallic pipe system. While plastic pipe can be connected to other plastic pipe by gluing or melt fusion and metallic pipe can be joined to another metallic pipe by welding or clamping with appropriate gaskets, the relatively simple expedients such as melt fusion and welding cannot be used for connecting a plastic pipe system to a metallic pipe system. Consequently, clamping of the sections of the plastic pipe system to the metallic pipe system has been found to be the only reliable means of connection available. A wide variety of fittings and adapters for connecting a plastic pipe system to a metallic pipe system have heretofore been proposed. One problem in such coupling systems is the inability to attain a leakproof connection, particularly where gas or water under pressure is to be transmitted through the system, as when utilizing a metallic pipe system for the main of a natural gas distribution system and plastic pipe for branch systems therefrom.

Usually a coupling or adapter is made primarily from plastic so that it may be melt fused to the plastic piping system. In order to appropriately couple the plastic adapter or coupling to the metallic pipe system, the prior art has provided a number of rather complex and expensive fittings for both the plastic adapter and the metallic pipe system to which it is to be attached. Since pressure in a radial direction is normally applied to the plastic adapter or coupling in order to provide a fluid-tight clamped joint, the application of such pressure often results in distortion, cracking or other damage to the plastic coupling or adapter. Additionally, where the plastic adapter is made of polyethylene, there are difficulties in maintaining a fluid-tight seal because such plastic adapters can contract and pull out from the clamped joint.

It is therefore an object of the present invention to provide an adapter for connecting plastic pipe systems to metallic pipe systems which overcomes the above-mentioned difficulties of the prior art devices.

Another object of the present invention is to provide a simple and inexpensive adapter for coupling a plastic pipe system to a metallic pipe system and, more particularly, to provide a polyethylene plastic adapter for coupling a polyethylene plastic pipe system to a metallic pipe system.

Another object of the present invention is to provide an adapter for coupling a plastic pipe system to a metallic pipe system which can be connected to the plastic system by simple melt fusion and to the metallic pipe system by a simple clamping system.

Yet another object of the present invention is to provide a plastic adapter for connecting a plastic pipe system to a metallic pipe system which can be coupled to the metallic pipe system by clamping without damage to the adapter.

Another and further object of the present invention is to provide an adapter for coupling a plastic pipe system to a metallic pipe system which provides a leakproof junction for service in the transport of gas or water under pressure, especially when the plastic pipe system and plastic adapter are formed from polyethylene. These and other objects and advantages of the present invention will be apparent from the following description.

SUMMARY OF THE INVENTION

In accordance with the present invention a coupling for connecting a plastic pipe system to a metallic pipe system is provided wherein the metallic pipe system has a first end with an attachment ring mounted thereon. The coupling comprises an elongated plastic sleeve having a first end adapted to be joined to the plastic pipe system and a second end adapted to be joined to the metallic pipe system. The second end of the sleeve has a flanged section around its outside circumference which extends radially outward from the exterior of the second end. Additionally, the coupling can be comprised of an elongated reinforcing tubular member which has an outside diameter substantially equal to the inside diameter of the second end of the plastic sleeve and a length less than the length of the plastic sleeve. The reinforcing member is mounted in the second end of the plastic sleeve with a first end thereof terminating inside the plastic sleeve intermediate the ends of the plastic sleeve and a second end thereof terminating flush with the second end of the plastic sleeve. Also, the coupling comprises a gland means adapted to slide over the outside of the second end of the plastic sleeve and attach to the attachment ring such that longitudinal pressure is exerted against the flange towards the first end of the metallic pipe system.

BRIEF DESCRIPTION OF THE DRAWINGS

FIG. 8 shows a cross-sectional view of an alternative system for clamping an adapter according to the present invention to a metallic pipe system. As illustrated, the system uses the adapter of FIG. 1a.

FIG. 9 shows another embodiment of a clamping system for use with an adapter according to the present invention. As illustrated, the system uses the adapter illustrated in FIG. 1a.

DESCRIPTION OF THE PREFERRED EMBODIMENTS

The adapter of the present invention provides a simple and inexpensive means for coupling a plastic pipe system such as a polyolefin pipe system to a metallic pipe system such as a cast iron pipe system. The adapter of the present invention is particularly useful for connecting a plastic pipe system and a metallic pipe system utilized in the transport of natural gas or water under pressure.

Additionally, the adapter of the present invention is particularly useful for connecting a polyethylene pipe system and a metallic pipe system because the invention is capable of taking advantage of certain properties of the polyethylene pipe, such as its malleability, in order to use a flange to reinforce the gasket in creating a fluid type seal or even to replace the gasket in creating a fluid type seal, as further described below. The invention is especially well suited for use with polyethylene pipe because of polyethylene's tendency to creep and, hence, polyethylene pipe's tendency to axially pull-out from clamping connections with metallic pipe systems. As used herein the term "polyethylene" broadly designates ethylene resins where such resins are made by the polymerization of predominantly ethylene, whether homopolymers, copolymers, terpolymers, and the like, or a blend of such polymers, or whether such polymers have been crosslinked.

Figures 1A, 1B, 1C:
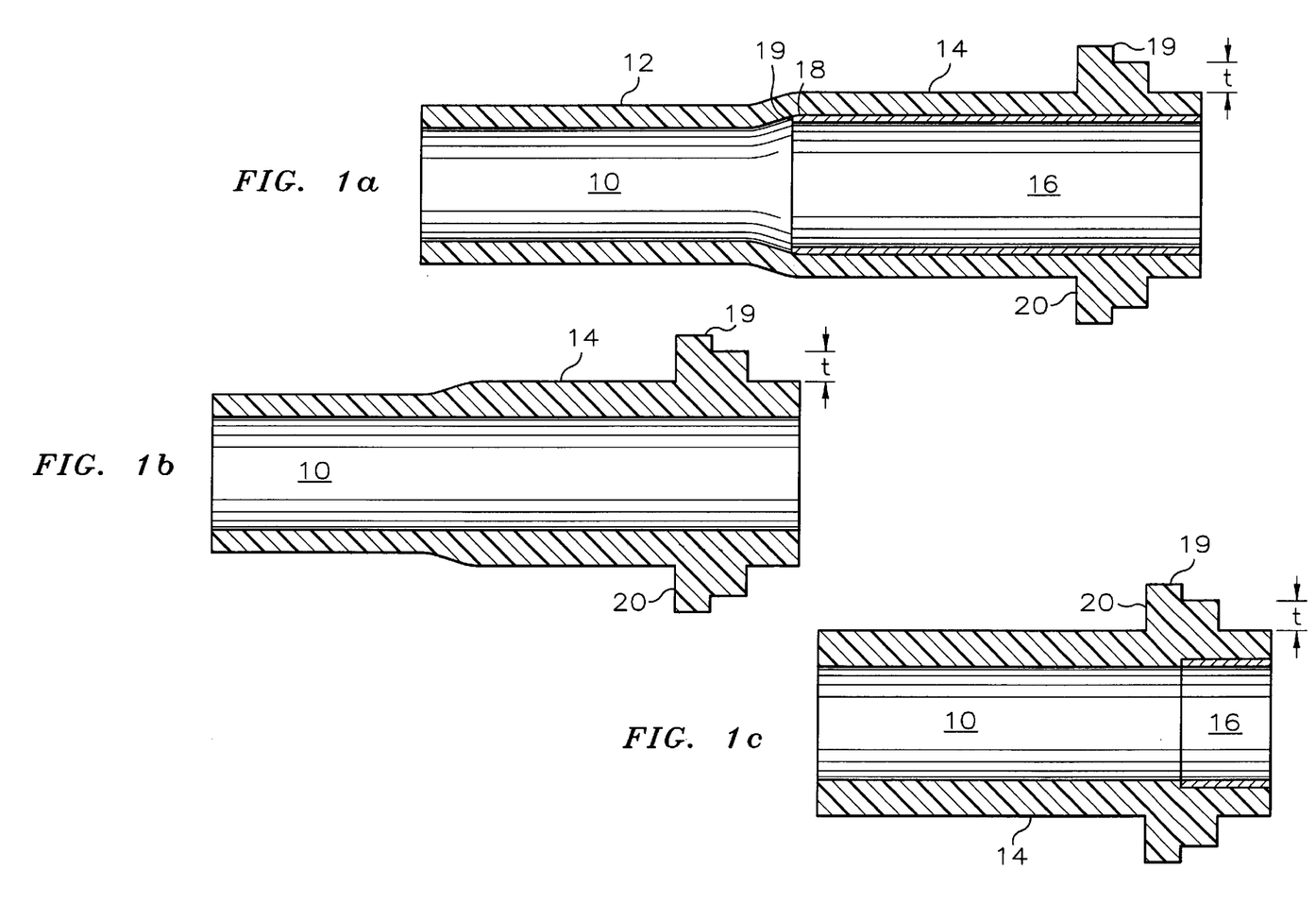
FIGS. 1a–1c of the drawings are cross-sectional views of adapters according to the present invention.

Referring now to FIGS. 1a–1c, the coupling of the present invention comprises an elongated plastic sleeve 10, having a first end 12 adapted to be jointed to a plastic pipe system and a second end 14 adapted to be joined to a metallic pipe system. The plastic sleeve 10 can be made of polyolefin pipe but obviously should be of the same type plastic as the plastic piping system to which it is to be joined in order to facilitate joining the two. Moreover, it is preferred that the plastic sleeve and piping system both be made of polyethylene in order to take advantage of the malleable properties of that material. The end 12, which is to be joined to the plastic pipe system, is shown as a plain pipe end but could be a bell end adapted to receive a plain pipe end of the plastic pipe system. In this illustrated instance, the two joints can be glued, however, for use in transporting gas or water under pressure, it is preferable that end 12 be of the same outside and inside diameter as the plain pipe end of the plastic pipe system so that the two can be butted and melt fused together. As will be discussed in greater detail hereinafter, the second end 14 is adapted to be joined to a metallic pipe section by clamping. In order to supply sufficient clamping pressure to the end 14 to provide a leakproof connection, particularly for use in transporting gas or water under pressure, it is highly desirable that the end 14 which is to be clamped to the metallic piping system be reinforced. For this purpose, end 14 can be thicker than end 12 to provide greater stiffness, as illustrated in the embodiment shown in FIG. 1b; however, it is preferred that a reinforcing tubular member 16 be mounted within end 14 of sleeve 10 to achieve the necessary reinforcement, as shown in FIGS. 1a and 1c. Reinforcing member 16 is preferably made of stainless steel but alternative materials such as steel, brass, bronze, PVC, fiberglass, etc, are useable. Also, reinforcing member 16 preferably has an outside diameter substantially equal to the inside diameter of end 14 of the plastic sleeve 10. Member 16 can be press fit or radially swaged outwardly into end 14 of the plastic sleeve. Alternatively, the inside diameter of end 14 may be counter-bore machined and member 16 inserted or press fit into the counter-bore recess, as illustrated in FIG. 1c.

When the reinforcing member 16 is press fit or swaged into end 14 of the plastic sleeve 10, as in FIG. 1a, there is a tendency for the end of member 16 to gouge the internal wall of sleeve 10 and thus to weaken the sleeve. In order to prevent this gouging or weakening of the sleeve 10, reinforcing member 16 can be tapered from its diametric exterior inwardly and toward the end thereof to provide a tapered portion 18 and a rounded edge 17. Tapered portion 18 should extend from a line around the outside surface of reinforcing tubular member 16 for a length of about four times the wall thickness of the member to provide a thickness of one half the wall thickness at the rounded edge 17. Plastic sleeve 14 has a substantially equal wall thickness throughout its length. The internal and external diameters of end 14 of plastic sleeve 10 can be larger than or equal to the respective internal and external diameters of end 12 of plastic sleeve 10. When the internal diameter of end 14 is larger than the internal diameter of end 12, this difference in the respective diameters is substantially equal to two times the thickness of the thickest portion of the reinforcing member 16 in order to accommodate a reinforcing member having an internal diameter substantially equal to the internal diameter of the end 12 of plastic sleeve 10.

Additionally, sleeve 10 is provided with a flange 20 on end 14. Flange 20 is preferably formed as an integral part of sleeve 10 but can also be attached by fusing a strip around the circumference of end 14. Flange 20 should be made of the same type plastic as plastic sleeve 10 and should be positioned such that the flange is continuous around the circumference of sleeve 10 and extends radially out from the diametric exterior of sleeve 10. Flange 20 should be positioned in order to insure a leakproof connection between sleeve 10 and the metallic pipe system by transmitting longitudinal pressure in order to restrain the adapter from axial pull-out as will be further explained below. Flange 20 should be sufficiently thick to withstand the pressures and stress created when the adapter is in use such as the axial attachment pressure, and thermal contraction, axial tension and mechanical bending forces. For polyethylene, this thickness t should be at least 1.25 times the pipe wall thickness, but preferably in a range of 1.5 to 2.0 times the pipe wall thickness. Additionally, flange 20 has a lip 19 sufficient to increase the load bearing area on the back side of flange 20 and provide a greater contact area to carry compressive contact forces without creep.

Figure 2:
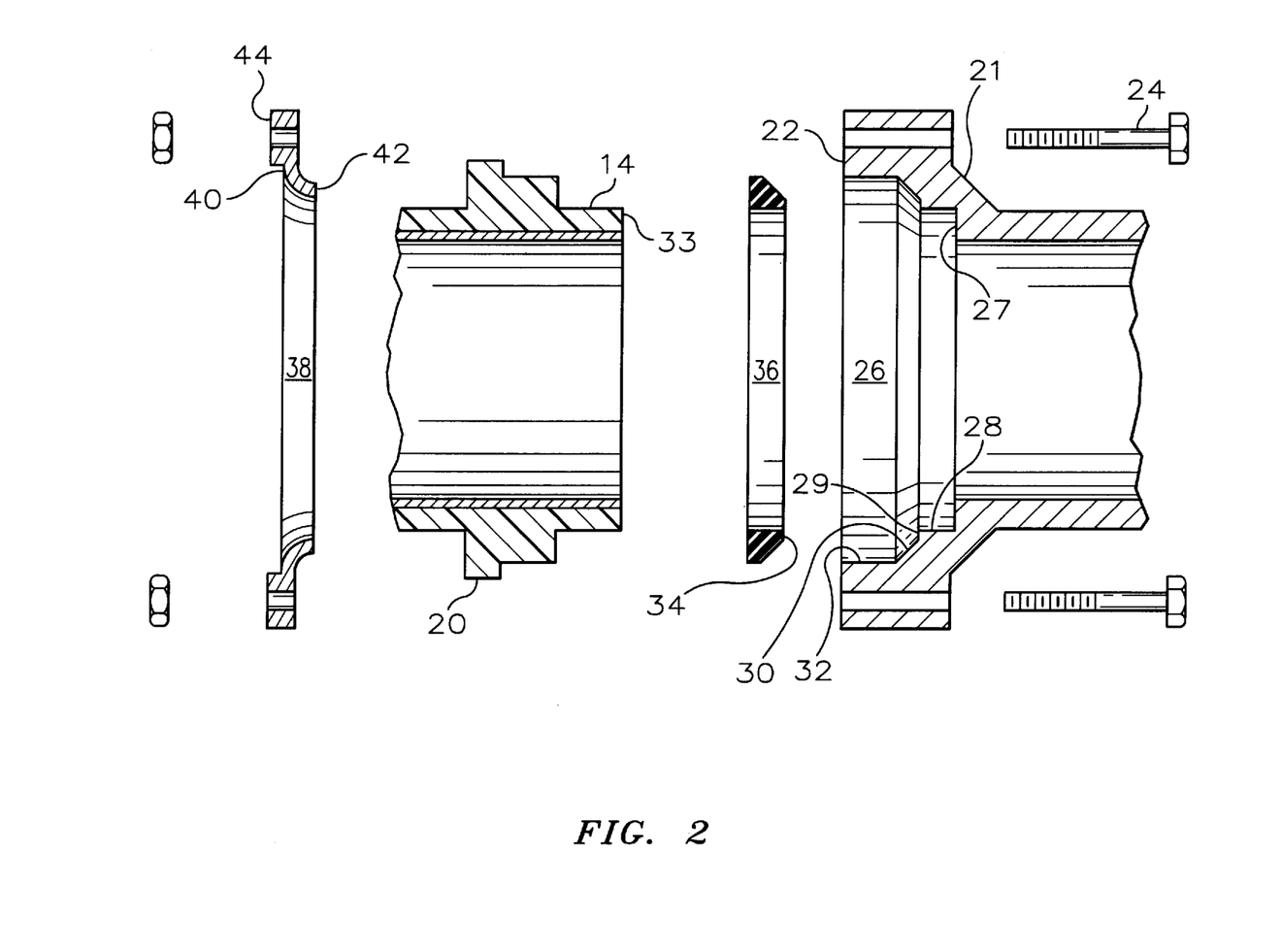
FIG. 2 is an exploded, cross-sectional view of one embodiment of a coupler system for an adapter according to the present invention.
Figure 5:
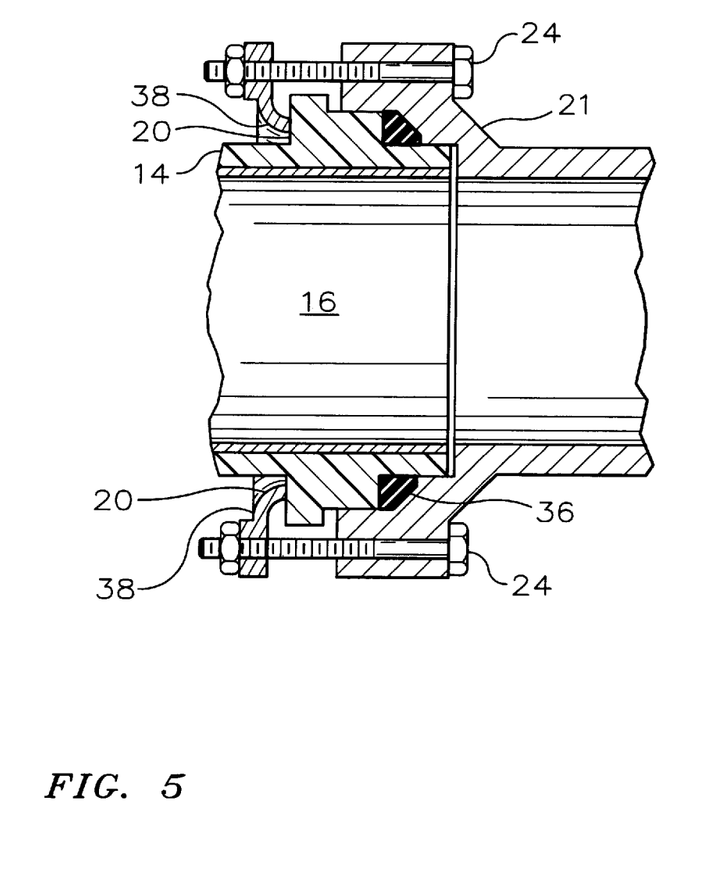
FIG. 5 is a cross-sectional view showing the adapter of FIG. 1a coupled to a metallic pipe by the coupling system of FIG. 2 and butt fused to a plastic pipe.
Figure 9:
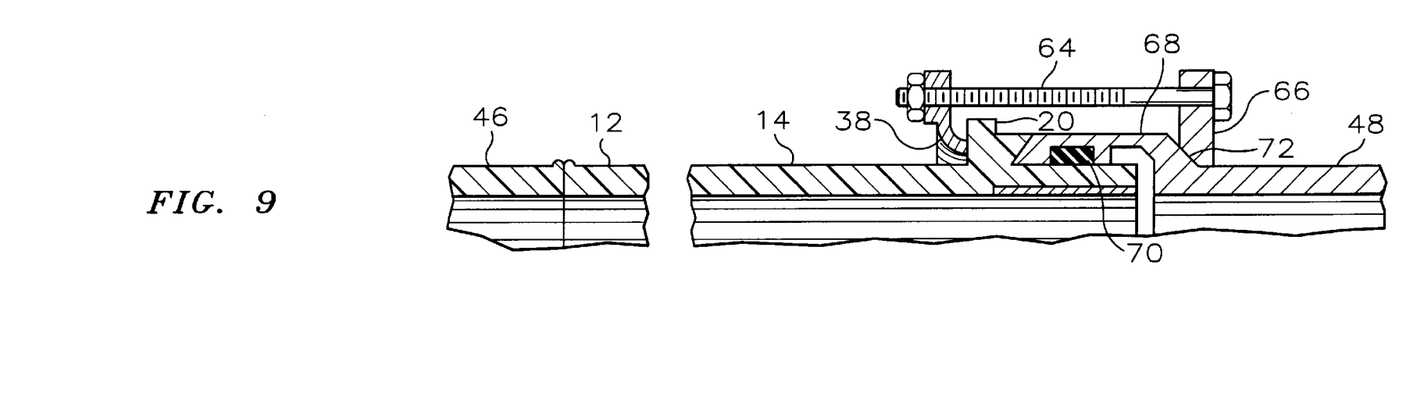

FIG. 2 of the drawings shows an exploded, cross-sectional view of one means of coupling end 14 of the adapter to a metallic pipe system. In accordance with FIG. 2, the end of the metallic pipe system is provided with an attachment ring 21. Attachment ring 21 may be a suitable metallic coupling welded to the metallic pipe of the metallic pipe system, a metallic coupling bolted to or clamped on the outside diameter of the metallic pipe system (as illustrated in FIG. 9), or it may be a coupling formed on the end of a metallic pipe section. In any event, attachment ring 21 is provided with an annular flange portion 22. Flange portion 22 is provided with holes to receive coupling bolts 24. Flange 22 can have a square periphery or a circular periphery and can be provided with protruding ears or lobes to accept bolts 24. Attachment ring 21 is provided with a shaped, internal groove 26 having a transverse shoulder 27, a first longitudinal portion 28, a second transverse shoulder 29, an inclined portion 30 and a second longitudinal portion 32. Shoulder 29 is dimensioned so as to receive shoulder 34 of annular, compressible sealing ring or gasket 36 such that the transverse edge 33 of end 14 just meets transverse shoulder 27 when the adapter is coupled to the metallic pipe system or such that a gap exists between the transverse edge 33 and transverse shoulder 27 when the adapter is coupled to the metallic pipe system (as illustrated in FIG. 5). The remainder of the groove means 26 generally conforms to the exterior configuration of sealing ring 36 and flange 20.

The interior of sealing ring 36 is adapted to slide over the exterior of end 14 of the adapter. Sealing ring 36 is designed so that it will abut flange 20 when it is placed onto end 14 of the adapter. Sealing ring 36 is preferably a rubber sealing ring. In order to couple section 14 of the adapter to the attachment ring 21, a metallic, mechanical joint gland 38 is provided. Gland 38 includes a ring portion 40 having a C-shaped, or J-shaped, cross section. The interior portion of ring 40 includes pressure lip 42. The inner surface of lip 42 can be flat or slightly angled and bears against the matching flat or angled surface of flange 20 to apply pressure to the flange 20 and hence to the gasket. Formed about the periphery of ring 40 are a plurality of ears or lobes 44 which are cast or drilled to receive mounting bolts 24 and to coincide with the holes in attachment ring 21. Lobes 44 are offset from pressure ring 42 so that, during assembly of the joint, ring 42 will apply pressure to flange 20 without lobes 44 contacting flange 22. The contact area of pressure ring 42 with flange 20 is engineered to be sufficiently large so as to carry the compressive contact pressure without viscoelastic creep of the polymeric material.

Figure 3:
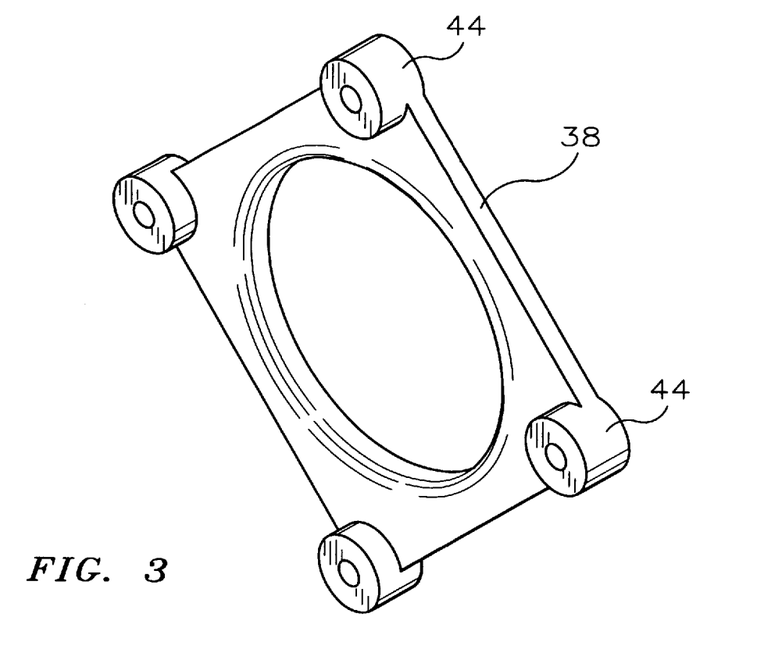
FIGS. 3 and 4 are perspective views of the gland means and gasket utilized in the clamping system of FIG. 2.
Figure 4:
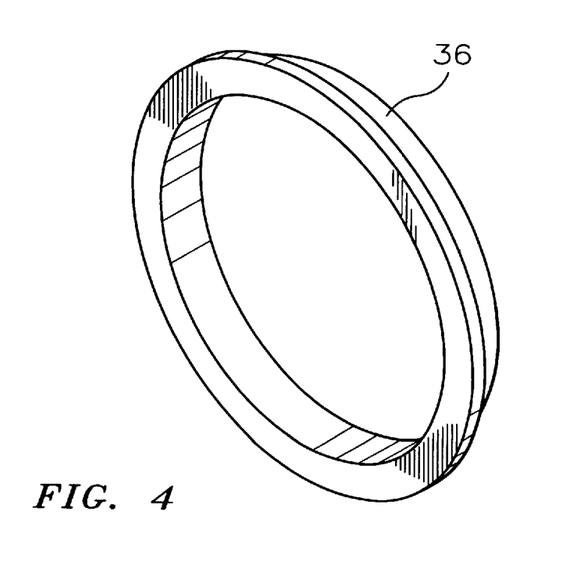

FIGS. 3 and 4 are perspective views of the gland means and gasket utilized in the clamping system of FIG. 2. From FIGS. 3 and 4 the clamping ring and gasket can be seen with greater clarity, including the positioning and design of lobes 44.

FIG. 5 of the drawings shows end 12 of the adapter butted to a section of plastic pipe 46 by melt fusion and end 14 of the adapter coupled to a metallic pipe system by means of the coupling system illustrated in FIGS. 2 through 4. As can be seen from FIG. 5, gasket 36 is encased by flange 20, attachment ring 21 and end 14 of adapter 10. Thus, as longitudinal pressure is provided by joint gland 38 to flange 20, gasket 36 undergoes longitudinal compression and is radially compressed inwardly against the outside surface of end 14. In this manner, flange 20 pushes on the gasket to force sealing and flange 20 restrains adapter 10 from pulling out of the coupling and thus, destroying the integrity of the seal.

Figure 6:
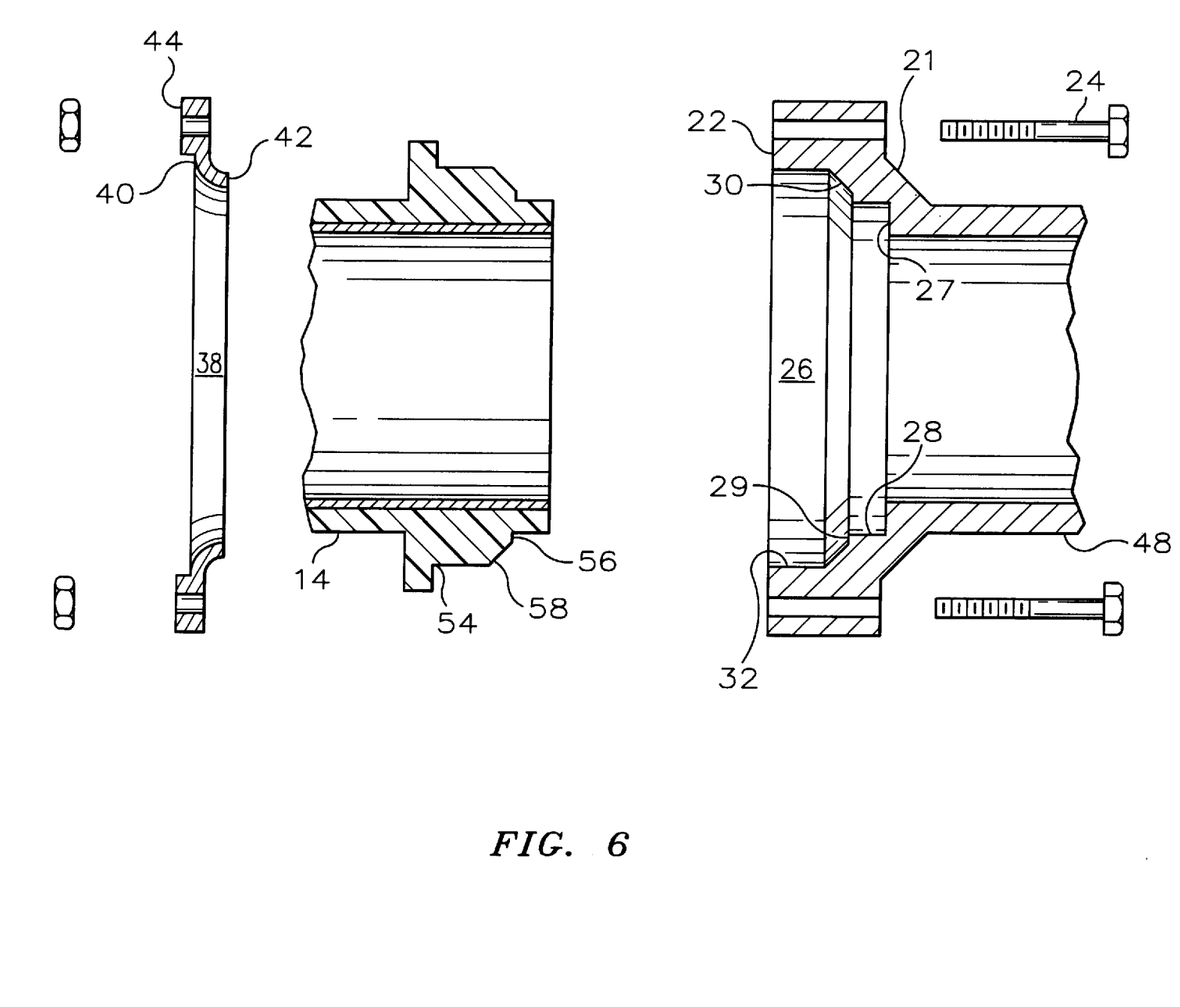
FIG. 6 is an exploded, cross-sectional view of another embodiment of an adapter according to the present invention.
Figure 7:
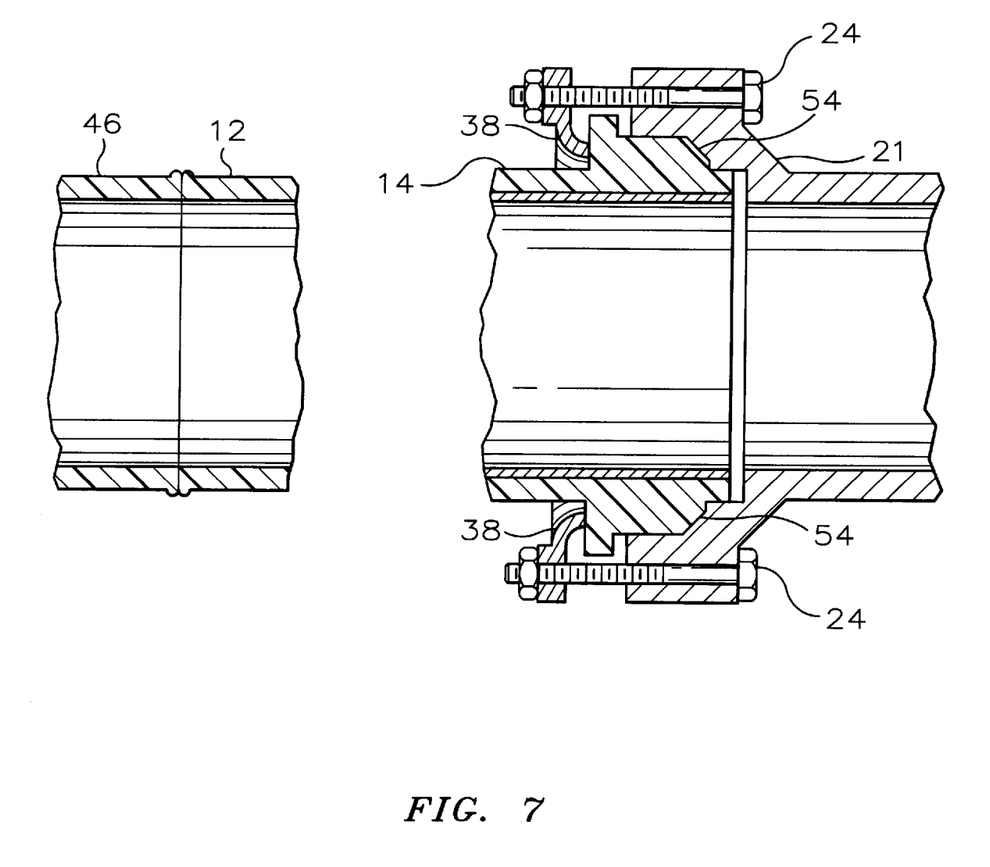
FIG. 7 is a cross-sectional view showing the adapter of FIG. 6 coupled to a metallic pipe by the coupling system of FIG. 6 and butt fused to a plastic pipe.

FIG. 6 of the drawings shows an alternative means of coupling a pipe end 48 of a metallic pipe system to end 14 of the adapter of the present invention. In FIG. 6, like components have been labeled with like numbers to that of FIG. 2. In accordance with FIG. 6, the end 48 of the metallic pipe system is provided with an attachment ring 21. Attachment ring 21 may be any suitable metallic coupling welded to the metallic pipe of the metallic pipe system, a metallic coupling bolted to or clamped on the outside diameter of the metallic pipe system or it may be a coupling formed on the end of a metallic pipe section. In any event, attachment ring 21 is provided with an annular flange portion 22. Flange portion 22 is provided with holes to receive coupling bolts 24. Flange 22 can have a square or circular periphery and can be provided with protruding ears or lobes to accept bolts 24. Attachment ring 21 is provided with a shaped, internal groove 26 having a traverse shoulder 27, a longitudinal portion 28, a second traverse shoulder 29, an incline portion 30 and a second longitudinal portion 32. Shoulder 27 can be dimensioned so as to receive end 14 of the adapter with a gap-space (as best seen in FIG. 7). Shoulder 29 can be dimensioned so as to receive the traverse shoulder 56 of flange 54 in butting relationship therewith. Similarly, incline portion 58 of flange 54 will abut incline portion 30 of internal groove 26. Thus, groove means 26 will generally conform to the exterior configuration of flange 54 and the portion of end 14 of the adapter which extends beyond flange 54. In order to couple section 14 of the adapter to the attachment ring 21, a metallic, mechanical joint gland 38 is provided. Gland 38 includes a ring portion 40 having a C-shaped, or J-shaped, cross-section. The interior portion of ring 40 includes pressure lip 42. The inner surface of lip 42 is preferably flat or slightly angled and bears against flange 20 to apply pressure to flange 54. Formed about the periphery of ring 40 are a plurality of ears or lobes 44 which are cast or drilled to receive mounting bolts 24 and to coincide with the holes in coupling 20. Lobes 44 are offset from pressure ring 42 so that during assembly of the joint, ring 42 will apply pressure to flange 54 without lobes 44 contacting flange 22.

FIG. 7 of the drawings shows end 12 of the adapter butted and joined to a section of plastic pipe 46 by melt fusion and end 14 of the adapter coupled to a metallic pipe system by means of the coupling system illustrated in FIG. 6. As can be seen from FIG. 7, flange 54 abuts the surface of groove means 26 of attachment ring 21 and undergoes longitudinal pressure from mechanical joint gland 38. Thus, flange 54 undergoes longitudinal compression to form a fluid-tight seal.

Figure 8:
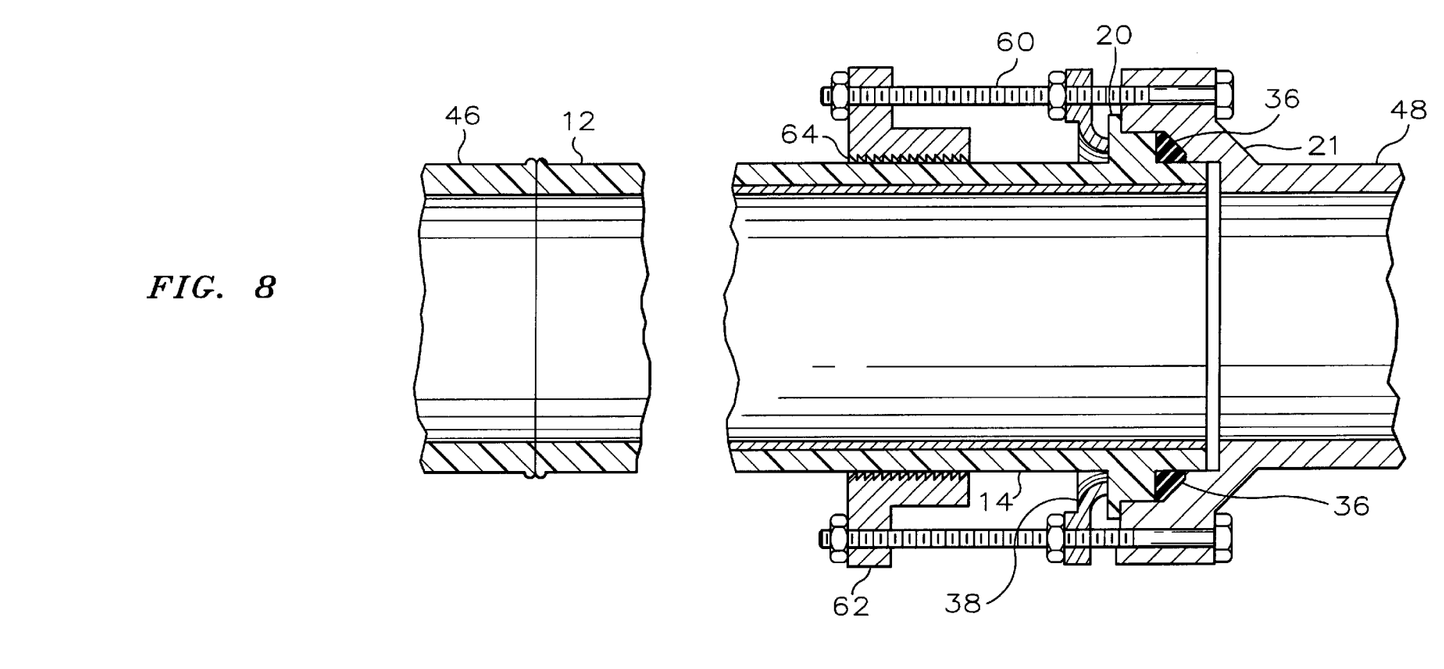

FIG. 8 shows another coupling means which can be utilized to join an end 48 of a metallic pipe system to end 14 of the adapter of FIGS. 5 and 7. The coupling means of FIG. 8 is similar to the adapter of FIG. 5, except that bolts 60 have a greater length than bolts 24 in order to receive clamping means 62. Clamping means 62 comes into contact with end 14 of the adapter by means of teeth 64 which bite into the surface of end 14 and, thus, aid in further restraining end 14 from pulling out from the coupling with pipe 48.

FIG. 9 illustrates yet another embodiment of the invention. The end 48 of a metallic pipe system has a spigot 68 formed, or welded, thereon. Spigot 68 receives end 14 of the adapter such that the end of spigot 68 abuts flange 20 and flange 20 provides longtitudinal pressure and radially inward pressure on the end of spigot 68. Additionally, spigot 68 is adapted to encase gasket 70 to further insure that a fluid tight seal is maintained by applying radially inward pressure on gasket 70. Attachment ring 66 is adapted to slide over metallic pipe system 48 and abut the shoulder 72 of spigot 68. Attachment ring 66 is held in place by bolt 64. Thus, when assembled bolt 64, attachment ring 66 and gland 38 provide longitudinal pressure to flange 20 and shoulder 72 to, thus, clamp the adapter to the metallic pipe and provide radially inward pressure to spigot 68 and gasket 70, thus securing them against the adapter end 14.

While the present invention has been described with reference to specific structures and materials of construction, it is to be understood that various modifications and substitutions will be apparent to one skilled in the art and therefore, the specific recitals contained herein are not to be considered limiting.

That which is claimed:

1. A coupling for connecting a plastic pipe system to a metallic pipe system, wherein said metallic pipe system has a first end with an attachment ring mounted thereon, said coupling comprising:

an elongated plastic sleeve having a first end adapted to be joined to said plastic pipe system and a second end adapted to be joined to said metallic pipe system, said second end having a flange formed as an integral part of said plastic sleeve, said flange being around the outside circumference of the sleeve and extending radially outward from the exterior of said second end, terminating in an outer surface area which includes a tapered portion such that the flange edge nearest said attachment ring is narrower than the flange edge farthest from said attachment ring; said attachment ring having an interior surface complementary to said flange for receiving and encasing said flange;

gland means adapted to slide over the outside of said second end of said plastic sleeve and attach to said attachment ring such that longitudinal pressure is exerted against said flange toward the first end of said metallic pipe system and wherein the shape of said flange and said longitudinal pressure are such that the entire outer surface area of said flange encased in said attachment ring contacts flush with said interior surface of said attachment ring forming a uniform fluid tight seal without the use of a sealing ring when the system undergoes longitudinal compression; and an elongated, reinforcing tubular member, having an outside diameter substantially equal to the inside diameter of said second end of said plastic sleeve and a length less than the length of said plastic sleeve and mounted in said second end of said plastic sleeve with a first end thereof terminating inside said plastic sleeve intermediate the ends of said plastic sleeve and a second end thereof terminating flush with said second end of said plastic sleeve.

2. A coupling in accordance with claim 1 wherein said gland means further comprises a clamping means having an inner surface with teeth projecting therefrom and adapted to fit around the outside of said second end of said plastic sleeve such that said teeth prevent movement of said plastic sleeve away from said metallic pipe system.

* * * * *

UNITED STATES PATENT AND TRADEMARK OFFICE
CERTIFICATE OF CORRECTION

PATENT NO. : 5,829,793
DATED : November 3, 1998
INVENTOR(S) : Harvey E. Svetlik

It is certified that error appears in the above-identified patent and that said Letters Patent is hereby corrected as shown below:

Drawings, sheet 7 of 7 consisting of Figures 8 and 9 should be deleted to appear as per attached sheet.

Signed and Sealed this

Ninth Day of March, 1999

Attest:

Attesting Officer

Q. TODD DICKINSON

Acting Commissioner of Patents and Trademarks

FIG. 8

FIG. 9